United States Patent Office 2,962,455
Patented Nov. 29, 1960

2,962,455

CELLULAR POLYURETHANE RESINS AND PREPARATION OF SAME

Fritz Hostettler, Charleston, and Robert W. McLaughlin, Belle, W. Va., assignors to Union Carbide Corporation, a corporation of New York No Drawing. Filed Apr. 18, 1957, Ser. No. 653,525

24 Claims. (Cl. 260—2.5)

This invention relates to foamed polymers derived from isocyanate-modified oxyalkylene-carbooxyalkylenes, and to a method of preparing same.

It has been proposed heretofore to prepare foamed polymers by forming a polyester of a diol and a dicarboxylic acid, e.g., ethylene glycol and adipic acid, lengthening the chain by reacting the terminal active hydrogens of the polyester with a diisocyanate and simultaneously or stepwise foaming and "curing" the isocyanate-modified polyester by internal development of carbon dioxide and cross linking of the modified polyesters.

Foams of this type have given promise of being superior to synthetic foams heretofore produced in developing better tensile strengths, resistance to ozone and to swelling in oils or organic solvents, and in ability to carry higher compression loads for a given density of foams. They also have given promise of being more versatile in that foams can be made rigid or flexible and open-celled or closed-celled, as desired. However, these advantages have not yet been fully realized. It is recognized, for example, that among the foamed polymers of the polyurethane type heretofore suggested, the rigid foams are extremely brittle and the flexibility of the flexible foams at low temperatures is inferior to that of latex foam and therefore leaves much to be desired.

The discovery has now been made that foamed polymers of widely varying and preselected properties can readily be prepared by isocyanate modification of oxyalkylene-carbooxyalkylenes. As indicated in this description of the invention, the foams may be rigid or flexible, open-celled or closed-celled and the flexible foams may be resilient or flaccid. Furthermore, the flexible foams are characterized by excellent low temperature properties in retaining flexibility at temperatures as low as about −50° C. and even lower.

The foamed products of the invention have the advantage of being capable of preparation without the application of external heat and of having low density, good resistance to solvents and very little tendency to support combustion. Unlike polyurethane foamed products heretofore proposed, foams from oxyalkylene-carbooxyalkylenes compare very favorably to latex foams in their flexibility at lower temperatures and can be prepared to have compression characteristics such that the compression-deflection curves thereof do not exhibit the "plateau effect." Another advantage that is most desirable from a commercial point of view is that the difficulties heretofore experienced in removing water of condensation from the polyesters and of keeping water out of the reaction until the proper time is very much reduced in that the oxyalkylene-carbooxyalkylenes utilized are formed without formation of water of condensation.

The foamed polymers of the invention are characterized by the presence of a highly developed network of cross linked isocyanate-modified oxyalkylene-carbooxyalkylenes in which the oxyalkylene-carbooxyalkylenes are connected to polyisocyanate residues by means of urethane or amido groups. The oxyalkylene-carbooxyalkylenes comprise chains of recurring oxyalkylene links and carbooxyalkylene links. The oxyalkylene links each comprise a terminal oxy (—O—) group, a terminal carbon atom, and an intermediate carbon atom. The carbooxyalkylene links each comprise a terminal carbooxy (—COO—) group, a terminal carbon atom and a chainlet of at least two intermediate carbon atoms. The terminal oxy and carbooxy groups of the links are connected to the terminal carbon atoms of next adjacent links. In a preferred embodiment, the oxyalkylene links are oxyethylenes derived from 1,2-epoxides and the carbooxyalkylene links are derived from lactones having at least four carbon atoms in the ring. The oxy and carbooxy groups connecting the alkylene links are recurrently distributed, i.e., in random or ordered distribution within a given chain. Thus, if L and E represent alkylene links derived from lactones and epoxides, respectively, a typical chain with ordered distribution may be represented by:

(I) 

and a typical chain with random distribution would be:

(II) 

Two or more chains are linked to one another through a polyvalent organic residue of a polyol, polyamine, amino alcohol, polycarboxylic acid, hydroxy carboxylic acid or amino carboxylic acid and the other ends of said chains are linked by means of urethane or amido groups to isocyanate residues which in turn are linked by means of urea groups to other isocyanate residues and isocyanate-modified oxyalkylene-carbooxyalkylenes.

In accordance with the invention, foamed polymers are prepared by forming oxyalkylene-carbooxyalkylenes having reactive terminal groups and extending the oxyalkylene-carbooxyalkylenes, building up the polymer network and developing the foam by reaction thereof with water and excess polyisocyanate. The network formation and building up of the foam can take place substantially simultaneously or in more or less distinct steps. From the point of view of most economical operation and directness of procedure as well as continuous operation, it is preferable to prepare the oxyalkylene-carbooxyalkylenes in a first stage and then to effect substantially simultaneous network and foam development by admixing the oxyalkylene-carbooxyalkylenes, polyisocyanate and water in the presence of a catalyst or by premixing the oxyalkylene-carbooxyalkylenes and water with catalyst and then adding the polyisocyanate. It is also possible to form a prepolymer by oxyalkylene-carbooxyalkylene extension, and then to develop the network and foaming. The various stages may be extended to the point of becoming substantially distinct or accelerated to the extent of making the successive stages almost simultaneous, e.g., by admixing the oxyalkylene-carbooxyalkylenes with isocyanate and catalyst and shortly thereafter adding water.

The preparation of oxylalkylene-carbooxyalkylenes in the first stage of this method is carried out by reaction of a lactone, an epoxide and a polyfunctional focal compound in the presence of a catalyst. The oxyalkylene-carbooxyalkylenes so prepared are characterized by the presence, in their molecular structure, of hydroxyl-terminated chains of alkylene links that are connected to one another by means of recurring divalent oxy and carbooxy groups. Some or all of the alkylene links may be substituted if desired.

The lactone used as one of the starting materials may be any lactone, or combination of lactones, having at least four carbon atoms in the ring and represented by the general formula:

(III) 

in which n is at least two, all the R's are hydrogen when n is two, at least six R's are hydrogen when n is more than two, and the remaining R's are hydrogen, alkyl, cycloalkyl, alkoxy or single ring aromatic hydrocarbon radicals.

The lactones preferred as starting materials in the method of this invention are unsubstituted epsilon-caprolactones, epsilon-caprolactones substituted on the carbon atoms in the ring by one, two or three lower alkyl radicals, and unsubstituted delta-valerolactones and gamma-butyrolactones. The preparation of the unsubstituted lactones referred to is well known. The substituted epsilon-caprolactones, and mixtures thereof, can readily be prepared by reacting a corresponding substituted cyclohexanone with an oxidizing agent such as peracetic acid, as described in copending application Serial No. 548,754, filed November 23, 1955. The cyclohexanones may be obtained from substituted phenols or by other convenient synthetic routes. Other lactones that are suitable as starting materials include alkoxy epsilon-caprolactones such as methoxy and ethoxy epsilon-caprolactones, and lactones such as zeta-enantholactone and eta-caprylolactone which have more than six carbon atoms in the ring.

The epoxides that are useful as starting materials in the method of the invention are represented by the general formula:

(IV) 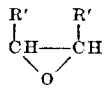

in which the R's are hydrogen, alkyl, chloralkyl, hydroxyalkyl, vinyl or phenyl radicals or in which the two R's form a closed hydrocarbon ring. Among the 1,2-epoxides of this description that deserve special mention are ethylene oxide, propylene oxide, 1-methyl-1,2-propylene oxide, 1,2-butylene oxide, butadiene monoxide, epichlorhydrin, glycidol, cyclohexene oxide and styrene oxide. Mixtures of these epoxides are also suitable and in some instances most highly desirable from the point of view of providing a ready means of modifying the properties of the oxyalklene-carbooxyalkylenes that are formed. Ethylene and propylene oxides, and mixtures thereof, are preferred because of their low cost and ease of reaction.

In addition to the 1,2-monoepoxides described, it is also permissible and within the scope of the invention to use diepoxides in which each oxygen bridge links adjacent carbon atoms if branched-chain oxyalkylene-carbooxyalkylenes are desired. Among the diepoxides that are suitable are butadiene dioxide, vinyl cyclohexene dioxide, dicyclopentadiene dioxide, 3,4-epoxy-6-methylcyclohexyl-3,4 - epoxy - 6 - methylcyclohexane-carboxylate, glycidyl ethers of polyhydric phenols such as bis(1,2-epoxypropoxy)4,4' - dimethyldiphenylmethane, bis(1,2-epoxypropoxy)4,4'-diphenylmethane and diglycidyl ether.

The polyfunctional focal compounds, so-called because they act as focal points in the formation of the oxyalkylene-carbooxyalkylenes and play a major role in determining the molecular weight and structure of a given oxyalkylene-carbooxyalkylene polymer, are those having at least two reactive hydrogens that are capable of opening a lactone ring or a 1,2-epoxide ring. Typical among compounds useful as such are polyfunctional alcohols, amines, mercaptans, phenols, amino alcohols and mercapto alcohols having the formula:

(V) R''(YH)$_z$ in which R'' is an aliphatic, cycloaliphatic, aromatic or heterocyclic radical, z is at least two; and the Y's are —O—, —S—, —NH— or —NR'''—, R''' being an alkyl, aryl, aralkyl or cycloalkyl radical. Diols and polyols of higher functionality are preferred.

The bifunctional focal compounds such as diols, diamines and amino alcohols having one amino group and one alcohol group, are useful primarily in the preparation of substantially linear oxyalkylene-carbooxyalkylene polymers so long as diepoxides are not employed. Representative bifunctional compounds that are suitable include aliphatic diols such as glycols of the general formula $HO(CH_2)_nOH$ in which $n$ equals two to ten, alkylene ether glycols of the formulae $HO[(CH_2)_mO]_nH$ and $HO[CH(CH_3)CH_2O]_nH$ in which $m$ is from two to five and $n$ is one to about ten, 2-2-dimethyl-1,3-propanediol, 2,2-diethyl-1,3-propanediol, 3-methyl-1,5-pentanediol, N-methyl- and N-ethyl diethanolamines; cycloaliphatic diols such as various cyclohexanediols, 4,4'-methylenebiscyclohexanol, 4,4'-isopropylidenebiscyclohexanol; aromatic diols such as hydroquinol; aromatic-aliphatic diols such as various xylenediols, hydroxymethyl-phenethyl alcohols, hydroxymethyl - phenylpropanols, phenylenediethanols, phenylenedipropanols; and various heterocyclic diols such as 1,4-piperazine diethanol; difunctional amino alcohols such as aliphatic amino alcohols of the general formula $HO(CH_2)_nNH_2$, where $n$ equals two to ten, N-methylethanolamine, isopropanolamine, N-methylisopropanolamine; aromatic amino alcohols such as para-aminophenethyl alcohol and para-amino-alpha-methylbenzyl alcohol; various cycloaliphatic amino alcohols such as 4-aminocyclohexanol; diamines of the general formula $H_2N(CH_2)_nNH_2$, monosecondary diamines of the general formula $R'''NH(CH_2)_nNH_2$, and disecondary diamines of the general formula $R'''NH(CH_2)_nNHR'''$, where $n$ equals two to ten and where R''' is alkyl, aryl, aralkyl or cycloalkyl; aromatic diamines, such as meta-phenylenediamine, paraphenylenediamine, toluene-2,4-diamine, toluene-2,6-diamine, 1,5-naphthalenediamine, 1,8-naphthalenediamine, metaxylylenediamine, para-xylylenediamine, benzidine, 3,3'-dimethyl-4,4'-biphenyldiamine, 3,3'-dimethoxy - 4,4' - biphenyldiamine, 3,3'-dichloro-4,4'-biphenyldiamine, 4,4'-methylenedianiline, 4,4'-ethylenedianiline, 2,3,5,6-tetramethyl-paraphenylenediamine, 2,5-fluorenediamine, and 2,7-fluorenediamine; and cycloaliphatic diamines such as 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis(3-aminoproyl) piperazine, as well as corresponding dithiols and thio-alcohols.

Higher functional focal compounds, i.e., where z is three or more, are useful in forming branched oxyalkylenecarbooxyalkylene polymers and include higher functional polyols such as glycerol, trimethylolethane, trimethylolpropane, 1,2,4-butanetriol, 1,2,6-hexanetriol, N-triethanolamine, N-triisopropanolamine, erythritol, pentaerythritol, N,N,N',N'-tetrakis(2-hydroxyethyl)ethylenediamine, dipentaerythritol, sorbitol, alkyl glycosides, and carbohydrates such as glucose, sucrose, starch, and cellulose; amino alcohols such as diethanolamine, diisopropanolamine, 2-(2-aminoethylamino)-ethanol, 2-amino-2(hydroxymethyl)-1,3-propanediol, and 2-amino-2-methyl-1,3-propanediol; and higher functional polyamines such as diethylenetriamine, triethylenetetramine, tetraethylenepentamine, diisopropylenetriamine, 1,2,5-benzenetriamine, toluene-2,4,6-triamine, 4,4',4'-methylidynetrianiline, and polyamines obtained by interaction of aromatic monoamines with formaldehyde or other aldehydes, for example:

(VI) 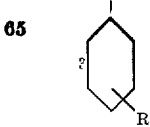 +2CH$_2$O ⟶ 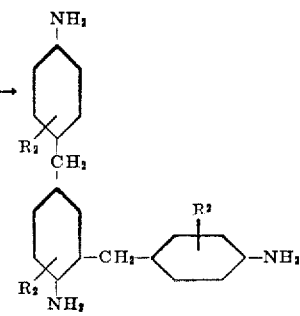

and other reaction products of the above general type, where $R^2$ is H or alkyl.

It is also possible to use, as a polyfunctional focal compound, one having one or more carboxylic acid groups, i.e., polycarboxylic acids, hydroxy carboxylic acids and amino carboxylic acids. Representative bifunctional compounds of this type include dicarboxylic acids such as pimelic, adipic, phthalic, naphthoic and dibenzoic acids; and hydroxy- and aminocarboxylic acids such as 6-hydroxycaproic, salicylic, 6-aminocaproic and aminobenzoic acids. Suitable higher functional acids include tricarballylic, citric and trimellitic acids. Water and hydrogen sulfide are also suitable as bifunctional compounds for initiating the reaction.

The oxyalkylene-carbooxyalkylene polymers prepared from the preferred starting materials are believed to be mixtures corresponding predominantly to one of the general formulae:

(VII) 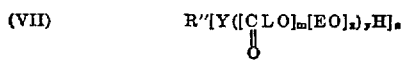

and (VIII) 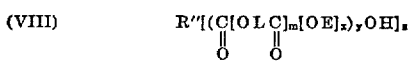

in which Y, R'', R''' and z are as defined earlier, the L's are substantially linear lactone residues having the general formula:

(IX) 

in which n and the R's are as described with reference to Formula III, the E's are 1,2-epoxide residues having the general formula:

(X) 

wherein the R's are as described with reference to Formula IV, the $m$'s are an average of at least one, the $x$'s average from about one-half to about six and one-half, the $y$'s average from about one to about fifty and the L's and E's are in random or ordered distribution, at least some of the L's in a given series being recurrent, i.e., separated from one another by E's, or at least some of the E's in a given series being recurrent, i.e., separated from one another by L's. Formula VII represents oxyalkylene-carbooxyalkylene polymers prepared with polyols, polyamines, polymercaptans, amino alcohols and mercapto alcohols as polyfunctional or focal compounds. Formula VIII represents oxyalkylene-carbooxyalkylene polymers prepared with polycarboxylic acids as focal compounds. Combinations thereof are possible with the use of hydroxy and amino carboxylic acids. It is to be understood that the formulae represent the predominant characteristic structure of the oxyalkylene-carbooxyalkylene polymers and not portions of the structure that are branched due to the use of diepoxide.

If terminal carboxylic acid groups are desired in the oxyalkylene-carbooxyalkylene polymers, the terminal hydroxyl groups may readily be converted by reaction with an excess of a dibasic acid or an anhydride thereof. Succinic, glutaric and phthalic anhydrides are preferred.

While we do not wish to be limited by any theory presented herein, it is believed that the lactone and epoxide molecules are opened in the course of the reaction to form substantially linear carbooxyalkylene and oxyalkylene links, respectively, i.e., substituted or unsubstituted alkylene links having terminal carbooxy and oxy groups. The opening of one such lactone or epoxide molecule produces a chain link having a terminal hydroxyl group which can then open another lactone or epoxide molecule. This produces a lengthening of the chain and the formation of still another hydroxyl for again opening a lactone ring or epoxide bridge. Additional lactone and epoxide residues add on in random or ordered fashion to form a chain of recurrent lactone residues and epoxide residues, said chain in essence comprising a series of alkylene links connected to one another by divalent carbooxy and oxy groups.

To illustrate, it is believed that a lactone is opened by reaction with a hydroxyl group and thus converted into an alkylene link connected by a carbooxy group at one end to a diol residue, for example, and by an oxy group at the other end to a terminal hydrogen, thus:

(XI)
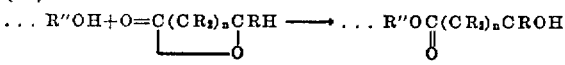

or

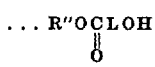

By reaction with a carboxylic acid group, a lactone will open to form an alkylene link having carbooxy groups at both ends, thus:

(XII)
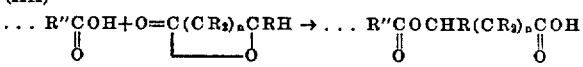

or

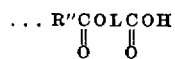

If more lactone molecules are available, they will form and add to previous links in the same manner. Epoxides are also opened by hydroxyl and carboxylic acid groups to form alkylene links. Thus, for example, ethylene oxide will react with a terminal OH group:

(XIII) 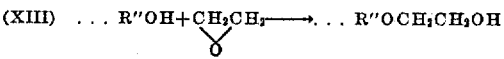

or

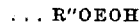

and with a terminal carboxylic acid group:

(XIV)
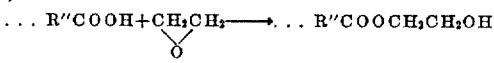

or

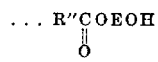

If more epoxide molecules are available, they will add to previous groups in the same manner, forming polyethylene ether chains. When a lactone and an epoxide are both available, they are believed to react in essentially the same manner and add in random fashion to form polyoxyalkylene chains interrupted occasionally by carbooxy groups.

It is to be understood and emphasized, therefore, that the L's and E's in Formula VII, for example, can be in random or ordered distribution and that the formula represents the predominant structure of the oxyalkylene-carbooxyalkylene polymers. The values of $m$ and $x$ in the individual

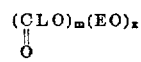

groups may be the same or different and the lengths and structures of the various

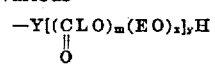

chains need not be the same. The $y$ of one chain may in fact equal zero, in which instance Formula VII, for example, may be more specifically expressed as:

(XV) 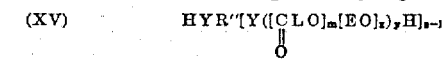

The distribution of the L and E groups in the oxyalkylene-carbooxyalkylene polymers is such that a lactone residue may occur at either or both ends of a series and an epoxide residue may likewise occur at either or both ends of a series. The general Formula VII is therefore intended to include structures that may more specifically be set forth as represented by the formulae:

(XVI)   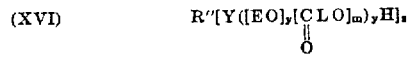

(XVII)  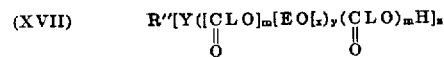

and (XVIII) 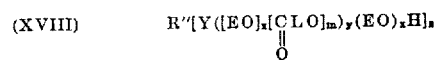

Similar distributions of lactone and epoxide residues are intended to be included within the scope of general Formula VIII.

When water is used in place of organic polyfunctional compounds, the reactions are essentially the same. With hydrogen sulfide, lactones are believed to add on:

(XIX)   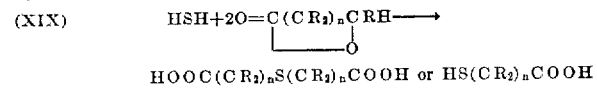

HOOC(CR₂)ₙS(CR₂)ₙCOOH or HS(CR₂)ₙCOOH and epoxides would open and add:

(XX)    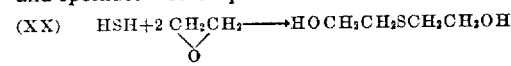

Additional lactones and epoxides would be opened and add to the chains in the manner described.

A preferred and most direct method of preparing the oxyalkylene-carbooxyalkylene polymers in the first stage, provided the polyfunctional focal compounds chosen do not contain nitrogen atoms carrying reactive hydrogen atoms, is to react the three initial materials described, i.e., the lactone, the epoxide and the polyfunctional compound at an elevated temperature in the presence of a catalyst. By way of illustration, the reaction of ethylene glycol, unsubstituted epsilon-caprolactone and ethylene oxide in accordance with this embodiment of the invention may, for example, be represented by the equation:

(XXI)   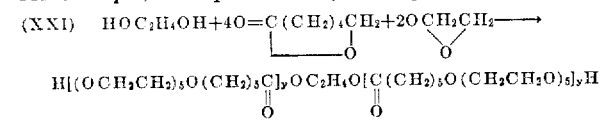

the lactone residues

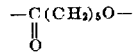

and the epoxide residues —CH₂CH₂O— however being distributed in random fashion within the brackets and the y's being an average of two.

The distribution of the lactone and epoxide residues within the oxyalkylene-carbooxyalkylene polymers can, as a practical matter, be influenced to a considerable extent by a selection of the temperature at which the starting materials are reacted and the rate at which the reactans are fed to the reaction mixture, although theoretically an efficient distribution is possible at any temperature up to about 150 to 200° C. Generally, lower alkylene epoxides react more rapidly with hydroxyl groups than do the lactones. With increasing molecular weight, epoxides react more slowly and approach the reaction rates of the lactones.

At lower temperatures, i.e., from about 10° C. to about 70° C., maximum intermixing of the lactone and epoxide residues is favored because then the rate at which the lactones react with the hydroxyl groups is slow enough to permit relatviely accurate correlation therewith of the rate of addition of epoxide to the reaction mixture. Furthermore, the heat of the exothermic reactions can be removed more effectively at slower reaction rates, thus minimizing acceleration of the reaction rates due to increases in temperature. Thus, for example, if under the conditions of reaction five mols of lactone could be expected to add onto terminal hydroxyls in the course of five minutes, it would be relatively easy to obtain an oxyalkylene-carbooxyalkylene polymer having chain segments alternately and repeatedly having an average of two epoxide residues and one lactone residue by mixing the lactone with the hydroxyl-bearing compound, adding ten mols of epoxide in the course of five minutes and cooling the reaction mixture to keep the temperature, and therefore the reaction rates, relatively constant. This type of oxyalkylene-carbooxyalkylene polymer, in which the random distribution of the epoxide and lactone residues is relatively efficient, is characterized by water-insolubility and by not crystallizing even at temperatures as low as −30° C.

At higher temperatures, e.g., from about 70 to 100° C. or higher, the rates of reaction are considerably faster and the difficulty of removing the heat of the reactions for controlling the temperature of reaction are multiplied. As a result, such higher temperatures favor a less efficient distribution of the lactone and epoxide residues with the result that an oxyalkylene-carbooxyalkylene polymer chain will contain a relatively large number of epoxide residues connected to one another in series and such series of epoxide residues are interrupted occasionally by series of lactone residues. Thus, for example, where the epoxide to lactone ratio is 2:1, an oxyalkylene-carbooxyalkylene polymer chain obtained at such a higher temperature and feed rate of epoxide may have an average of twenty or thirty epoxide residues connected in seriatim to one another and such series of epoxide residues may be interrupted or terminated by fairly long series of blocks of polylactones having an average of ten or fifteen lactone residues. This type of oxyalkylene-carbooxyalkylene polymer, in which the random distribution of epoxide and lactone residues is relatively inefficient, is characterized by water-solubility and a tendency to crystallize at temperatures of the order of 10 to 15° C.

It will be understood, therefore, that with this knowledge of the reactivity rates of epoxides relative to one another and relative to lactones, and the influence thereon of temperature conditions, suitable adjustments can readily be made to influence the reactions in desired directions and, therefore, the characteristics of oxyalkylene-carbooxyalkylene polymers and resins prepared therefrom.

Higher temperatures within the operable range of about 10° C. to 150 or 200° C., e.g., above about 100° C., are feasible provided the contact time is made correspondingly short so as to avoid dehydration side reactions, particularly when the catalyst is boron trifluoride. Lower temperatures, e.g., as low as 10° C., are operable but require longer reaction times than are considered economically desirable. Generally, therefore, elevated temperatures up to about 100° C. are preferred and temperatures between about 50 and 70° C. are considered optimum for maximum production and control with minimum dehydration.

The reaction is preferably promoted by the presence of Lewis acids such as the trifluoride, tribromide and trichloride of boron, the bromides and chlorides of aluminum, tin and titanium, and the chlorides of antimony, beryllium, bismuth, cadmium, gallium, iron, uranium, zinc and zirconium. The preferred catalysts are boron trifluoride and its complexes with such organic compounds as ethers, alcohols and polyols.

When the oxyalkylene-carbooxyalkylene polymers are prepared in this manner, it is essential to use, as initiators for the polycondensation thereof of lactone and epoxide residues, polyfunctional focal compounds that do not contain nitrogen atoms for the reason that the Lewis acid catalysts employed in the reaction form inactive complexes with nitrogen atoms. When a flexible foam is the ultimate desideratum, it is advantageous to avoid using lactones that are substituted on the carbon atom most remote from the carbonyl group of the lactone, e.g., the epsilon carbon of an epsilon-caprolactone. Use of such lactones when a boron trifluoride complex is the catalyst apparently causes dehydration of the second hydroxyl group that is formed and then results in a branched-chain structure of high hydroxyl content that is desirable when the ultimate product is to be a rigid foam.

The preparation of the oxyalkylene-carbooxyalkylene polymers in the first stage of the method of the invention can also be accomplished in three steps to result in a relatively ordered distribution of oxy and carbooxy groups. The first of these steps involves reacting the initial lactone or mixture of lactones with a molar excess of a monohydric alcohol as indicated in the equation:

(XXII)

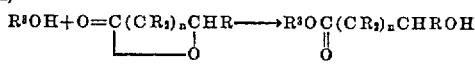

or

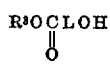

The reaction product of this step is then reacted with one or more 1,2-epoxides, or a combination thereof with diepoxide, as illustrated in the equation:

(XXIII)

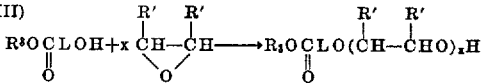

or

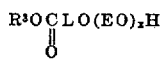

Finally, the resulting oxycarbooxy monomer is reacted with an excess of polyfunctional focal compound acting as a chain stopper, the reaction with a diol being illustrated by the equation:

(XXIV)

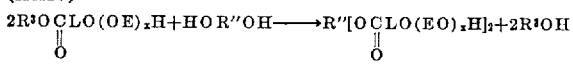

and the residual product self-polymerized by interaction of its terminal hydroxyls with the interior ester groups and the elimination of excess polyfunctional compound:

(XXV)

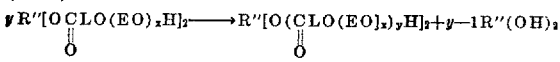

It will be understood, of course, that an amino group on the chain stopper will result in a carbamido linkage between an oxyalkylene-carbooxyalkylene series and the chain stopper residue and that a carboxylic acid group will result correspondingly in a carbooxy or ester type linkage.

The alcohol used in the first step of this embodiment and symbolized in the equation as $R^3OH$ is a primary or secondary monohydric alcohol having a lower boiling point than the polyfunctional chain stopper. Among those suitable for this purpose are aliphatic alcohols such as methanol, ethanol, propanol, isopropanol, 1-butanol, 2-butanol, tert.-butanol, 1-pentanol, 2-pentanol, tert.-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol. Methyl and ethyl alcohols are preferred.

Lactones having less than six carbon atoms in the ring, i.e., where $n$ is less than four, can be used in accordance with this embodiment of the method even though homopolyesters thereof tend to revert to the monomer at elevated temperatures and therefore do not form stable products. They are suitable here because the addition of as little as one mol of a 1,2-epoxide per mol of lactone results in the preparation of a linear oxyalkylene-carbooxyalkylene polymer in which reversion to small rings is excluded. While it is true that with some of the lower molecular weight lactones somewhat less than 100%, i.e., about 80% and in some instances as low as 60%, conversion takes place, the oxyalkylene-carbooxyalkylene polymers from these lower molecular weight lactones are nevertheless entirely suitable for the purposes of the invention.

The first step in this more indirect manner of preparing the oxyalkylene-carbooxyalkylene polymers is preferably carried out at a temperature of the order of about 60 to 100° C. and in the presence of acidic ester interchange catalysts such as sulfuric, hydrochloric, phosphoric acids and boron trifluoride complexes such as trifluoride ethyl etherate. Basic and neutral esters interchange catalysts that also promote the reaction include such metals as lithium, sodium, potassium, rubidium, caesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali and alkaline earth metals, zinc borate, lead borate, zinc oxide, lead silicate, lead arsenate, litharge, lead carbonate, antimony trioxide, germanium dioxide, cerium trioxide, cobaltous acetate and aluminum isopropoxide. Catalyst concentrations between about 0.01 and about 0.5% by weight based on the total charge are suitable. The preferred range is from 0.05 to 0.2%.

In order to obtain an optimum proportion of the hydroxy ester, it is important to utilize a considerable excess, e.g., five to twenty mols of alcohol per mol of lactone. Thus, for example, by working with a ten-fold excess of alcohol, 60 to 95% of the lactone employed is converted to the hydroxy ester. The remainder consists either of unreacted lactone or of higher alcohol adducts, i.e., compounds in which two or more lactone residues are joined to an alcohol to form a higher molecular weight hydroxy ester. It is quite possible, however, to proceed with a somewhat smaller excess of alcohol and thereby obtain a hydroxy polyester adduct in which the average number of lactone residues added to the alcohol is in excess of one.

After the formation of the hydroxy ester has been completed, the excess alcohol present in the reaction mixture must be removed. This is most conveniently accomplished by distillation at temperatures as high as 100° C. However, since the ester interchange catalysts used in this step to open the lactone ring also catalyze the reformation of alcohol and lactone, in some instances fairly rapidly at temperatures as low as 50° C., it is necessary to remove or to destroy the catalyst before removal of the excess alcohol. Acidic and basic catalysts such as sulfuric acid and sodium methoxide can easily be converted to inactive salts by neutralization, or they can readily be removed completely by means of ion exchange resins. If, however, the catalyst for the first step is destroyed by formation of an active salt, e.g., sodium sulfate, the hydroxy esters formed in the reaction of the first step must be distilled off because otherwise such salts would interfere with the catalytic process of the second step. Neutral ester interchange catalysts, while plentiful and operable, are difficult to remove or to destroy and are therefore not preferred.

In the second step of the alternative method for preparing the oxyalkylene-carbooxyalkylene polymers, the hydroxy esters formed in the first step are reacted with 1,2-epoxides in the presence of a catalyst to form lengthened hydroxy esters containing ether groups. The epoxides that are suitable in this step are those that have already been described as corresponding to general Formula IV. Mixtures of epoxides are also suitable and in some instances preferred for desirably altering the structure of the oxyalkylene-carbooxyalkylene polymers. Diepoxides may also be employed in conjunction with the monoepoxides. Ethylene and propylene oxide and mixtures thereof are preferred because of their low cost and ease of reaction.

The catalysts that are most suitable for the second step are the Lewis acids named earlier, particularly boron trifluoride and the complexes thereof with organic compounds as well as aluminum trichloride, zinc chloride and tin chloride. Bases such as tertiary organic amines, sodium and potassium methoxides and hydroxides may also be employed although they are considered not as suitable because they require relatively high reaction temperatures of the order of 90 to 150° C. and high catalyst concentrations of the order of 0.2 to 2% in order to be effective. Thus, while these other catalysts are operable, they are not preferred because of the high temperatures and catalyst concentrations that are necessary and which tend to promote reversion of the hydroxy esters to the initial lactones and alcohols. Boron trifluoride complexes such as the ethyl etherate are preferred.

The operable range of reaction temperatures for the second step of this alternative method is from below about 10° C. to about 150° C. At the lower temperatures in this range the reaction proceeds slowly, while at higher temperatures there is danger of ring closure of the hydroxy ester with formation of lactone and alcohol. The preferred temperature range is from 45 to 100° C. since it allows rapid reaction rates with a minimum of reversion to the lactone.

Any unreacted lactone from the first step that remains at the beginning of the second step will take part in the reaction with the 1,2-epoxide when a Lewis acid catalyst is employed. The amount of such lactone reacting in the second step depends upon the duration and the temperature of the reaction, the catalyst concentration as well as on the structure of the lactone and the epoxide used.

The oxy-carbooxy monomers obtained in accordance with the second step are polymerized in the third step with the aid of a polyfunctional focal compound acting as a chain stopper to form linear or branched oxyalkylene-carbooxyalkylene polymers of any desired preselected molecular weight. Difunctional focal compounds acting as chain stoppers in this alternative method of preparation yield, as they do when used as initiators in the more direct process first described, linear polymers so long as no appreciable amounts of diepoxides have been used. Diepoxides will result in the formation of branched polymers regardless of the functionality of the focal compounds that are employed as chain stoppers in the third step.

The polyfunctional focal compounds that are suitable as chain stoppers in the third step of this alternative method are generally the polyols, polyamines and amino alcohols described earlier with reference to general Formula V, as well as the polycarboxylic acids, hydroxy carboxylic acids and amino carboxylic acids named earlier in the description of the single step method. Polyols are preferred.

It is important, from the point of view of exercising control over the molecular weight of the oxyalkylene-carbooxyalkylene polymers, to use a considerable excess, preferably about five- to ten-fold the amount stoichiometrically required, of polyfunctional focal compound in the third step and that it be one having a higher boiling point than the alcohol used in the first step. This excess and higher boiling point are required in order to insure a substantial displacement of the monofunctional alcohol from the intermediate product of the second step. In instances in which the focal compound itself is difficult to remove, e.g., when a considerably higher boiling polyol is employed, the preferred procedure is to use a stoichiometric amount thereof in conjunction with a substantial excess of another polyol that is relatively easy to remove. Thus, for example, where the alcohol used in the first step is methanol and the desired chain stopper is pentaerythritol, it is possible by this procedure to remove substantially completely all of the methanol with a considerable excess of added ethylene glycol and preferentially to retain in the polymer the stoichiometric amount of pentaerythritol initially used rather than the ethylene glycol.

The third step in the alternative method of preparing the oxyalkylene-carbooxyalkylene polymers in the first stage is preferably, but not necessarily, carried out with the use of a catalyst such as a basic or neutral ester interchange catalyst to accelerate the reaction. Among the catalysts that are suitable for this purpose are such metals as lithium, sodium, potassium, rubidium, caesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, zinc borate, lead borate, zinc oxide, lead silicate, lead arsenate, litharge, lead carbonate, antimony trioxide, germanium dioxide, cerium trioxide, magnesium acetate, cobaltous acetate, manganese acetate, lead acetate, lead 2-ethylhexoate, lead salicylate and lead benzoate. Catalyst concentrations between about 0.001 and 1.0%, based on the weight of the starting monomer, are suitable. The preferred range is from 0.01 to 0.5%. The catalyst has also the function of destroying the boron trifluoride complex left in the reaction mixture of the second step, which, if not inactivated, may cause side reactions such as dehydration.

The catalysts that are particularly effective, and therefore preferred, in polymerizing the monomers are the organic tin compounds described in copending application Serial No. 577,952, the organic titanium compounds described in copending application Serial No. 577,950, and the titanium chelates and acylates described in copending application Serial No. 577,954, all filed April 13, 1956.

The third step is carried out within the temperature range of 120 to 250° C., most effectively between about 150 and 200° C. It is preferably carried out in two phases, the first at a temperature of about 120 to 170° C. and the later phase, for further polymerization, at 150 to 250° C. At temperatures below 150° C. the reaction rate is relatively slow whereas at temperatures above 200° C. there is danger that thermal degradation of the reactants and products may begin to occur. It is desirable, therefore, to carry out the final phase of the third step under a vacuum and to exclude air from the reactants by blowing an inert gas such as nitrogen through the reaction mixture.

The average molecular weight and reactivity of the mixture of oxyalkylene-carbooxyalkylene polymers with an isocyanate can readily be determined by analysis for hydroxyl and carboxyl content. The acid or carboxyl number (mg. of KOH per gram of oxyalkylene-carbooxyalkylene polymer using phenol-phthalein as an indicator) is a measure of the number of terminal carboxyl groups. The hydroxyl number, which is a measure of the number of terminal hydroxyl groups and is defined in terms of mg. of KOH per gram of oxyalkylene-carbooxyalkylene polymer, is determined by adding pyridine and acetic anhydride to the oxyalkylene-carbooxyalkylene polymer and titrating the acetic acid formed with KOH. The sum of the acid or carboxyl number and the hydroxyl number, referred to as the reactive number, is an indication of the average number of terminal groups present in the oxyalkylene-carbooxyalkylene polymer and therefore is in turn an indication of the degree of polymerization. A mixture of oxyalkylene-carbooxyalkylene polymers containing long chain molecules will have a relatively low reactive number while oxyalkylene-carbooxyalkylene polymers containing short chains or highly branched molecules will possess relatively higher reactive numbers. Molecular weight can readily be calculated from the hydroxyl and carboxyl numbers and the functionality of the polyfunctional focal compound employed by the formula:

(XXVI) $\quad M.W. = \dfrac{\text{Functionality} \times 1000 \times 56.1}{\text{OH No.} + \text{COOH No.}}$ It will become apparent from the foregoing that oxyalkylene-carbooxyalkylene polymers prepared in the first stage can be "tailor-made" to best suit the particular type of foamed polymer ultimately desired. Their molecular weight can be controlled accurately by a preselected proportioning of the polyfunctional focal compound reacted with the other components or retained in the oxyalkylene-carbooxyalkylene polymers. The smaller the amount of focal compound relative to the lactone and epoxide, the higher the molecular weight will be. The relative proportions of oxy and carbooxy groups can be controlled by the proportions of epoxides and lactones relative to one another, higher proportions of oxy groups, e.g., about 3.2:1 to 6.5:1 being promoted by higher proportions of epoxides to yield oxyalkylene-carbooxyalkylene polymers that are water-soluble or at least relatively hydrophilic, and lower proportions, e.g., from 3.2:1 to about 0.5:1 or less, yielding oxyalkylene-carbooxyalkylene polymers that are hydrophobic. The extent to which the occurrence of oxy and carbooxy groups is random or ordered can be influenced by the availability of the components for reaction in the course of the preparation. This in turn can be controlled by selections of reaction temperature and of rate of feed of epoxide to the reactants. The oxyalkylene-carbooxyalkylene polymers can be made linear by employing only difunctional alcohols or other difunctional focal compound for reaction with lactones and monoepoxides, or they can be made branched to any desired degree by use of higher functional polyols, etc., or by employing diepoxides, or both. Smaller side chains can be introduced by use of substituted lactones, epoxides other than ethylene oxide, or both. While the terminal groups of the oxyalkylene-carbooxyalkylene polymers are normally hydroxyl, they can readily be made carboxyl by treatment with a dicarboxylic acid or anhydride, all as described.

We prefer to select the lactones, epoxides and polyfunctional focal compound, and their relative proportions, so as to produce oxyalkylene-carbooxyalkylene polymers having a molecular weight in the range of about 400 to as high as about 10,000, depending on the functionality of the oxyalkylene-carbooxyalkylene polymer and upon whether a rigid, semi-elastic or elastic foam is desired. The preferred molecular weights are dependent at least in part on the type of foamed product ultimately desired. For rigid foams the preferred range is about 400 to 1000; for semi-rigid foams it is about 1000 to 1600 and for flexible foams the preferred ranges are about 1600 to 2800 with substantially linear oxyalkylene-carbooxyalkylene polymers and about 3500 to 6000 with branched oxyalkylene-carbooxyalkylene polymers. The relative proportions of epoxide to lactone are selected with a view to the characteristics desired in oxyalkylene-carbooxyalkylene polymers and in the foamed product. Oxyalkylene-carbooxyalkylene polymers having proportions by weight ranging from about 15:85 to 70:30, or molar proportions of about 0.5 to 6.5 mols epoxide per mol of lactone are liquid and generally most useful. Oxyalkylene-carbooxyalkylene polymers with weight ratios of oxyalkylene to carbooxyalkylene links in the 15:85 to about 55:45 range are insoluble in water and those having ratios in the 15:85 to about 55:45 range form foams that resist humid aging. Oxyalkylene-carbooxyalkylene polymers in which the weight ratio of oxyalkylene to carbooxyalkylene links exceeds about 55:45 are progressively more soluble in water and foam products prepared from oxyalkylene-carbooxyalkylene polymers in which this ratio exceeds about 55:45 become progressively less resistant to humid aging.

It is to be understood that the terms "oxyalkylene-carbooxyalkylene" and "oxyalkylene-carbooxyalkylene polymer," as used herein, are intended to include not only the products prepared by copolymerization of a single lactone and a single epoxide with a single polyfunctional focal compound, but also those involving the polymerization of two or more different lactones, epoxides or focal compounds.

The formation of a prepolymer by extension of the oxyalkylene-carbooxyalkylene polymers is accomplished by reaction with a very considerable molar excess, e.g., about 100 to 700%, preferably about 350 to 500%, of a polyisocyanate.

When the isocyanate and the oxyalkylene-carbooxyalkylene each have two reactive terminal hydroxyl groups, the reaction involved is a so-called 2:2 type of polymerization illustrated by the equation:

(XXVII)

HO(OP)OH + excess OCNGNCO ⟶

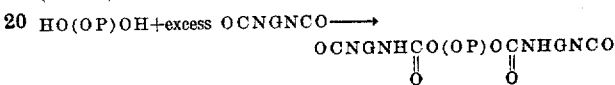

in which OP stands for the oxyalkylene-carbooxyalkylene polymers of the first stage exclusive of the terminal hydroxyl groups and G stands for an aliphatic, cycloaliphatic or aromatic diisocyanate, exclusive of the reactive isocyanate groups, such as m- and p-phenylene diisocyanates; 2,4- and 2,6-tolylene diisocyantes; 2,3,5,6-tetramethyl-para-phenylene diisocyanate; o-, m-, and p-xylylene diisocyanates; 4,4'-biphenylene diisocyanate; 3,3'-dimethyl-4,4'-biphenylene diisocyanate; 3,3'-dimethoxy-4,4'-biphenylene diisocyanate; p,p'-bibenzyl diisocyanate; p,p'-diphenylmethane diisocyanate; 4,4'-methylene-bis-ortho-tolyl diisocyanate; 1,5-naphthalene diisocyanate; tetramethylene diisocyanate; hexamethylene diisocyanate; and various other diisocyanates such as those listed in the table of Siefken (Annalen 562, pages 122–135, 1949).

When the oxyalkylene-carbooxyalkylene polymer with which the isocyanate is reacted in the second stage is one having three or more terminal hydroxy groups, a highly branched prepolymer will result. Thus, for example, the reaction of an oxyalkylene-carbooxyalkylene polymer having three terminal hydroxyl groups with a diisocyanate may be represented by the equation:

(XXVIII)

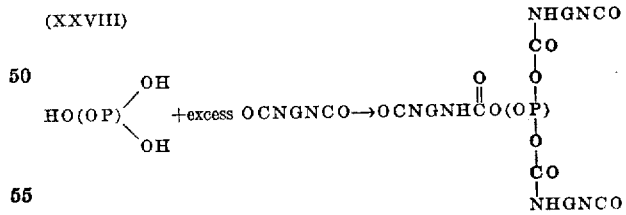

Branched isocyanate-modified oxyalkylene-carbooxyalkylene polymers are also obtainable, in accordance with the invention, by reacting an oxyalkylene-carbooxyalkylene polymer having two terminal hydroxyl groups with an isocyanate having more than two reactive isocyanate groups as illustrated by the equation:

(XXIX)

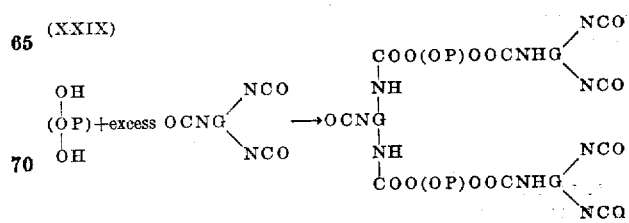

A number of suitable higher functional polyisocyanates are listed in the table of Siefken, referred to earlier.

One of the more attractive types of polyisocyanate useful for this purpose is the product (XXX)

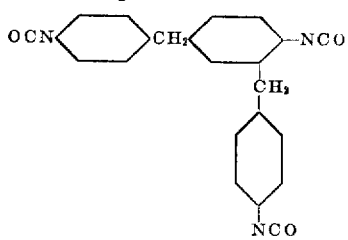

as well as the isomers thereof, obtainable by phosgenation of the reaction product of aniline and formaldehyde.

The second stage of the method may also be modified considerably. Thus, for example, it is within the scope of the invention to add linear or branched lactone polyesters such as are described in copending application Serial No. 577,950, filed April 13, 1956, or mixtures thereof, or small amounts of polyfunctional compounds such as glycerol, 1,2,4-butanetriol, 1,2,6-hexanetriol, trimethylolethane, trimethylolpropane, diethanolamine, triethanolamine and N,N,N',N'-tetrakis(2-hydroxyethyl)-ethylenediamine before reacting the oxyalkylene-carbooxyalkylene polymer with isocyanate. This modification has the advantage of further diversifying the combinations of characteristics obtainable in the prepolymer and in the ultimate foam product, increasing the number of cross linking sites and therefore of resulting, in the final stage, in a rapid build-up of viscosity simultaneously with $CO_2$ development. While the use of comparatively low molecular weight compounds in accordance with this modification requires a somewhat higher amount of isocyanate, it has the additional advantage of increasing the tear strength of the foams produced.

The reactions involved in forming prepolymers in the second stage are capable of proceeding at relatively low temperatures, i.e., up to about 60° C., in the presence of a catalyst and at higher temperatures up to about 120° C. in the absence of a catalyst. The choice of temperature and presence or absence of catalyst in the second stage depends primarily upon whether the prepolymer is to be stored for an extended period of time before it is used to form the ultimately desired foam or whether the foaming stage is to take place immediately after the formation of the prepolymer. If the foaming is to take place soon after the preparation of the prepolymer, or the production of the foam is made continuous, it is advantageous to carry out the reaction at a temperature below about 80° C. and preferably below 60° C. in the presence of a catalyst. If on the other hand the prepolymer is to be stored before use, it is preferable to carry out the second stage in the absence of a catalyst and at a somewhat higher temperature within the range of about 80 to 120° C.

Catalysts that are suitable for accelerating prepolymer formation as well as the foaming and cross linking or curing reaction include inorganic and organic bases such as sodium hydroxide, sodium methylate, sodium phenolate, tertiary amines and phosphines. Tertiary amines such as triethylamine, triisopropylamine, tributylamine, triamylamine, triethanolamine, N-methylmorpholine, N-ethylmorpholine, N,N'-dimethylpiperazine, N,N-dimethylhexahydroaniline, tribenzylamine and N,N-dimethylbenzylamine, are particularly suitable as catalysts. Catalyst concentrations between about 0.1 and about 3% by weight, based on the weight of the total ingredients, have been found adequate.

When a prepolymer is intended to be stored before use, it is often also desirable to add a retarder during or after the formation of the prepolymer. This not only slows down, as the name implies, the rate of reaction between terminal hydroxyl and isocyanate groups, but also inhibits reaction between the urethane groups formed during the prepolymer synthesis and the isocyanate groups. Among the retarders that are suitable for the oxyalkylene-carbooxyalkylene-isocyanate reaction are acids such as hydrochloric acid, sulfuric acid, phosphoric acid, boric acid, various organic acids, organic acid halides such as acetyl chloride and acetyl bromide, sulfonyl halides such as para-toluene sulfonyl chloride, inorganic acid halides such as phosphorus tribromide, phosphorous trichloride, phosphorous oxy chloride, sulfonyl chloride and thiamyl chloride, as well as sulfur dioxide and acidic sulfones.

When it is desired to form a foam, the mixture of prepolymer and excess unreacted diisocyanate is mixed with water, preferably in the presence of a catalyst. This involves several reactions that proceed simultaneously. One, illustrated schematically in the equation:

(XXXI) 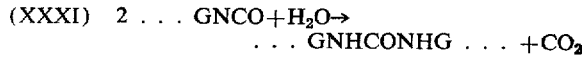

involves the reaction between the isocyanate groups and water to form urylene links and carbon dioxide. This reaction has the important effect of producing carbon dioxide in situ for forming the voids of the final foamed product and also of linking the terminal isocyanate groups and thereby, where a 2:2 type polymerization preceded, of linearly extending the prepolymer. Another of the reactions involves reaction of the urylene links so formed with unreacted isocyanate groups to form biuret cross links as illustrated by the equation:

(XXXII)

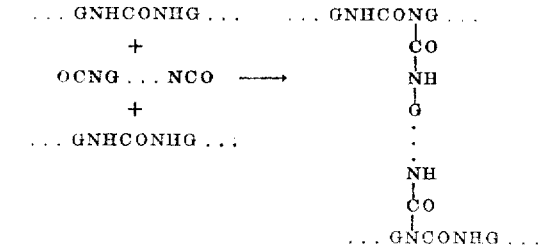

In addition, the free isocyanates react with one another, as shown in Equation XXXI, and with the isocyanates represented in Equations XXVII to XXIX to form chains of isocyanate residues connected to one another and to the isocyanate-modified oxyalkylene-carbooxyalkylene residues by urylene groups. The formation of a good foam depends upon a simultaneous development of carbon dioxide and a cross linking of the molecules to trap the carbon dioxide and thus prevent collapse of the foam.

Depending upon the desired density of the foam and the amount of cross linking desired, the amount of water added in the third stage should be such that the ratio of equivalents of water to residual isocyanate equivalents, i.e., the isocyanate which is present as excess isocyanate over the reactive groups of the oxyalkylene-carbooxyalkylenes, is most preferably kept within the range of about 0.8:1 to 1.2:1.

In reviewing the basic method of forming the foamed polymers and the various modifications described, it will become apparent that, after preparation of the oxyalkylene-carbooxyalkylene polymers, the process can be carried out continuously with substantially simultaneous oxyalkylene-carbooxyalkylene extension, cross linking and foam formation, batchwise and in distinctly separate stages, or in any intermediate manner. The continuous method, involving substantially simultaneous oxyalkylene-carbooxyalkylene extension, cross linking and foam formation, is the most direct and economical, requiring little more than a foaming machine as equipment. The other extreme, involving step-wise preparation of a prepolymer followed by foaming and network development, is desirable when the final processing is to be kept to a minimum, the prepolymer being formed in the absence of a catalyst at temperatures of the order of 80 to 120° C. Methods of intermediate speed and directness are also desirable, e.g., forming a prepolymer by reaction of oxyalkylene-carbooxyalkylene polymers with isocyanate in the presence of a catalyst, followed shortly by addition of water.

It is also possible to effect foaming by use of a polycarboxylic acid instead of water as an agent for simultaneously producing carbon dioxide and cross linking. The basic reaction involved in this modification is:

(XXXIII) ... GNCO+R'(COOH)$_y$
→ ... GNHCOR' ... +CO$_2$

Among the polycarboxylic acids symbolized by

R'(COOH)$_y$ in Equation XXXIII that are suitable are such dicarboxylic acids as oxalic, succinic, maleic, glutaric, adipic, pimelic, suberic, azelaic and sebacic acids, various oxy acids such as 6,6'-oxy-dihexanoic acid, aromatic acids such as the phthalic acids, naphthoic acids, alkylene dibenzoic acids, biphenyl dicarboxylic acids and higher functional acids such as tricarballylic, aconitic and pyromellitic acids.

When a linear oxyalkylene-carbooxyalkylene employed is one having terminal carboxylic acid groups, its reaction with excess diisocyanate produces simultaneously a development of carbon dioxide and a lengthening of the chain as illustrated in the equation:

(XXXIV) HOOC(OP)COOH+2OCNGNCO→
OCNGNHCO(OP)CONHGNCO+2CO$_2$ and cross linking will proceed between terminal isocyanate groups and the newly formed amido groups as illustrated in the equation:

(XXXV)

```
.. GNHCO(OP)CONHG ...
          +
     OCNG ... NCO        ⟶
          +
.. GNHCO(OP)CONHG ...

... GNCO(OP)CONHG ..
            |
            CO
            |
            NH
            |
            G
            .
            .
            NH
            |
            CO
            |
     ... GNHCO(OP)CONG ...
```

It will be understood that if the functionality of either or both the carboxylic acid group-terminated oxyalkylene-carbooxyalkylene polymer and isocyanate is greater than two, additional cross linking will take place.

It has been found that while the reactions illustrated in Equations XXXIII and XXXIV develop carbon dioxide and are therefore operable for foaming, the amount of carbon dioxide developed is insufficient to give the ultimate foam a low enough density to be competitive with latex and polyvinyl chloride foams. For this reason, water is used in addition to the carboxylic acid in order to augment the carbon dioxide production and obtain a low density foam that is competitive with others on the market. It will be understood, of course, that the addition of water constitutes not only a source of additional carbon dioxide but also augments cross linking and chain extension reactions among the free isocyanates and the isocyanate-modified oxyalkylene-carbooxyalkylenes as described earlier.

The rigidity or flexibility of the final foam product is influenced by the degree of branching in the molecular structure as well as by the molecular weight of the oxyalkylene-carbooxyalkylene chains. Highly branched chain structures such as are produced by use of focal compounds having a functionality higher than two in the oxyalkylene-carbooxyalkylene polymer preparation stage, by reacting a linear oxyalkylene-carbooxyalkylene polymer with a polyisocyanate having more than two isocyanate groups, or by reacting an oxyalkylene-carbooxyalkylene polymer with a large excess, e.g., in the upper portion of the 200 to 700% excess range, of diisocyanate, or any combination thereof, tend to trap carbon dioxide bubbles as rapidly as they are formed and to produce rigid, closed-cell foams whereas linear or less highly branched chain structures favor production of flexible, open-cell foams. The use of oxyalkylene-carbooxyalkylene polymers of relatively low molecular weight, i.e., in the lower portion of the 400 to 10,000 molecular weight range, favors formation of rigid foams whereas those of higher molecular weights tend to form more flexible foams, all other factors being equal.

While there are no precise lines of demarcation as to the relative influences of branching and molecular weight of the oxyalkylene-carbooxyalkylene chains or branching of the isocyanate-modified oxyalkylene-carbooxyalkylene structure, it may be stated as a general guide that foams of maximum rigidity are prepared by use of oxyalkylene-carbooxyalkylene polymers within a molecular weight range of about 400 to 1000, for semi-rigid foams the molecular weight of the oxyalkylene-carbooxyalkylene polymers should be of the order of about 1000 to 1600, for flexible open-cell foams the oxyalkylene-carbooxyalkylene polymers should be substantially linear and have molecular weights of about 1600 to 2800, and for flexible closed-cell foams the oxyalkylene-carbooxyalkylene polymers should be branched and have molecular weights of about 3500 to 6000. It will be understood, of course, that combinations of these characteristic-influencing factors can also be used. Thus, for example, an excellent flexible foam of very desirable properties is formed with a combination of 70 to 95% by weight linear oxyalkylene-carbooxyalkylenes having an average molecular weight of 1600 to 2800 and 30 to 5% by weight branched oxyalkylene-carbooxyalkylenes having an average molecular weight of about 3500 to 6000.

In addition, it is well to bear in mind that branching in the molecular structure of the foam product can also be increased by use of a large excess of isocyanate or by use of an isocyanate having a functionality greater than two. Thus, for example, excellent rigid foams can be prepared from oxyalkylene-carbooxyalkylenes of minimum molecular weight by use of a large excess, e.g., in the upper portion of the 200 to 700% range, of isocyanate.

In order to stabilize the composition during the foaming operation and to avoid breaking of the CO$_2$ bubbles in the early stages of the foaming, it is advantageous to employ a small percentage, e.g., about 0.001 to 10% by weight, based on the total ingredients, of a stabilizing or thickening agent such as ethoxylated cellulose, available on the market as "Ethocel," hydroxy ethylated cellulose, available as "Cellosize," benzyl cellulose, acetyl cellulose, acetylbutyryl cellulose, hydroxy ethylated polyvinyl alcohol, polyvinyl chloride, vinyl chloride-vinyl acetate copolymers, polyvinyl acetate, polyvinyl butyral, polymeric methylmethacrylate, polymeric butylmethacrylate, high molecular weight polyethylene oxide, bentone, and metallic soaps of fatty acids such as aluminum stearate.

It is within the scope of the invention to add fillers such as clays or diatomaceous earths in quantities up to 20% by weight, based on the weight of total ingredients. Dyes may also be added prior to the foaming step and are often desirable since polyurethane foams normally exhibit a slight tendency to yellow on aging.

Small quantities, of the order of 0.01 to 1% by weight, based on the weight of total ingredients, of silicone oils and paraffin oils are useful for regulation of the bubble size of the foam. As the amount of these additives increases, the foam bubbles become larger. In addition to the effect of oxyalkylene-carbooxylalkylene structure and choice of diisocyanate referred to earlier as influencing the formation of open or closed cell foams, the use of certain surfactants as known in the art may also be relied upon to influence the type of foam structure that is formed.

The foam products of the invention can readily be prepared to have, in addition to the characteristics already referred to, densities advantageously within the range of about 1.5 to 20 lbs. per cubic foot. Within this range, densities of the order of 2 to 8 lbs. per cubic foot are generally preferred for rigid structural foams, and flexible foams having densities of 1.5 to 3 lbs. per cubic foot show the most remarkable improvements over flexible foams heretofore produced.

The utility and advantages of the product and methods of the invention will become more apparent from the following examples included to illustrate the best modes now contemplated for carrying out the invention.

In evaluating the physical properties of the foams produced in the various examples, density was determined by weighing a cylindrical sample two inches in diameter and one inch in thickness and thereupon calculating the density in lbs. per cubic foot. To measure the tensile strength, a cylindrical sample one inch thick and one square inch in cross section was adhered to a metal plate at each end and extended in a Scott tensile tester, the load at rupture being recorded in terms of lbs. per square inch (p.s.i.). To evaluate compression, a cylindrical sample two inches in diameter and one inch thick was placed on the anvil (six inch diameter) of an Instron equipped for compression tests, the cross head moved a plate of three inches in diameter toward the anvil at a rate of two inches per minute, and the stress load on the anvil was plotted against the deflection of the sample. The stress load is given in p.s.i. for 10 and 50% deflections. Low temperature tests were carried out on a Castle compression tester with cylindrical samples one square inch in cross section and one inch thick compressed between platens to 25% deflection, the stress load being recorded at various temperatures. The platens and the samples were housed in an insulated cabin in which the temperature was controlled to ±1° C., the temperature being varied from +20 to −50° C. and the load being recorded in p.s.i.

Example 1

1100 grams (9.65 mols) of unsubstituted epsilon-caprolactone, 56.8 grams (.92 mol) ethylene glycol and 6.2 grams (.045 mol) trimethylolpropane were heated to a temperature of 60 to 70° C. in the presence of 2.6 grams boron trifluoride ethyl etherate (47% $BF_3$) as catalyst and 1100 grams (25 mols) ethylene oxide were added thereto in the course of 5.25 hours. The resulting mixture of oxyalkylene-carbooxyalkylene copolymers was a yellow liquid having a carboxyl number of 1.6 and a hydroxyl number of 49.1.

75 grams of the oxyalkylene-carbooxyalkylene copolymers thus prepared were mixed with 2.2 grams water, one gram of a polyoxyethylated vegetable oil known as "Emulphor El 719" and 2 grams N-methylmorpholine. 28 grams of a mixture of 65% 2,4- and 35% 2,6-tolylene diisocyanates containing 0.5% "Ethocel," an ethoxylated cellulose having an average ethoxy content of 47.5 to 49%, were then added under intensive agitation. As soon as the foaming reaction began, the mixture was transferred into an open mold and allowed to expand.

The foam produced was removable from the mold after one hour, but was allowed to set for twenty-four hours at room temperature for complete curing. The test results were as follows:

Density, lbs./cu. ft. _____ 2.62
Tensile strength, p.s.i. _____ 29
Load at 10% deflection, p.s.i. _____ 0.96
Load at 50% deflection, p.s.i. _____ 1.56

Load versus temperature at 25% deflection:
  Temp., ° C.—
    20 _____load, p.s.i__ 1.2
    0 _____do____ 1.4
    −10 _____do____ 1.6
    −20 _____do____ 1.75
    −30 _____do____ 2.5
    −40 _____do____ 3.7

Example 2

1100 grams (9.65 mols) of unsubstituted epsilon-caprolactone and 62 grams (one mol) ethylene glycol were heated to a temperature of 60 to 70° C. in the presence of 2.6 grams boron trifluoride ethyl etherate (47% $BF_3$) as catalyst and 1125 grams (25.6 mols) ethylene oxide were added thereto in the course of 4.7 hours. The resulting oxyalkylene-carbooxyalkylene polymer mixture was a light yellow viscous liquid having a carboxyl number of 1.3 and a hydroxyl number of 50.7.

100 grams of the oxyalkylene-carbooxyalkylene polymers thus prepared were mixed with 3.1 grams water and 2 grams N-methylmorpholine. 28 grams of a mixture of 65% 2,4- and 35% 2,6-tolylene diisocyanates containing 0.5% "Ethocel" were then added under intensive agitation. As soon as the foaming reaction began, the mixture was transferred into an open mold and allowed to expand.

The foam produced was removable from the mold after one hour, but was allowed to set for twenty-four hours at room temperature for complete curing. The test results were as follows:

Density, lbs./cu. ft. _____ 2.4
Tensile strength, p.s.i. _____ 18
Load at 10% deflection, p.s.i. _____ 0.57
Load at 50% deflection, p.s.i. _____ 1.27
Load versus temperature at 25% deflection:
  Temp., ° C.—
    20 _____load, p.s.i__ 1.25
    0 _____do____ 1.4
    −10 _____do____ 1.6
    −20 _____do____ 1.9
    −30 _____do____ 2.4
    −40 _____do____ 3.2

Example 3

1250 grams (11 mols) of unsubstituted epsilon-caprolactone and 67 grams (0.5 mol) trimethylolpropane were heated to a temperature of 60 to 70° C. in the presence of 2.95 grams boron trifluoride ethyl etherate (47% $BF_3$) as catalyst and 1250 grams (28.4 mols) ethylene oxide were added thereto in the course of 6.5 hours. The resulting mixture of branched oxyalkylene-carbooxyalkylene polymers was a pale yellow, very viscous liquid having a carboxyl number of 1.3 and a hydroxyl number of 31.9.

50 grams of the branched oxyalkylene-carbooxyalkylene polymers thus prepared and 50 grams of the linear oxyalkylene-carbooxyalkylene polymers prepared as described in Example 2 were mixed with 3.1 grams water and 2 grams N-methylmorpholine. 40 grams of a mixture of 65% 2,4- and 35% 2,6-tolylene diisocyanates containing 0.5% "Ethocel" were then added under intensive agitation. As soon as the foaming reaction began, the mixture was transferred into an open mold and allowed to expand.

The foam produced was removable from the mold after one hour, but was allowed to set for twenty-four hours at room temperature for complete curing. The test results were as follows:

Density, lbs./cu. ft. _____ 2.06
Tensile strength, p.s.i. _____ 23
Load at 10% deflection, p.s.i. _____ 1.18
Load at 50% deflection, p.s.i. _____ 4.01

Load versus temperature at 25% deflection:
Temp., °C.—
  20 ............................load, p.s.i... 2.6
  0 ...............................do.... 2.7
  −10 .............................do.... 2.7
  −20 .............................do.... 3.1
  −30 .............................do.... 3.8
  −40 .............................do.... 4.6

*Example 4*

The procedure of Example 3 was repeated, 100 grams of the branched oxyalkylene-carbooxyalkylene polymers prepared as described in that example being used in place of the combination thereof with linear oxyalkylene-carbooxyalkylene polymers.

The resulting foam, which had predominantly closed cells, gave the following test results:

Density, lbs./cu. ft. ............................... 1.89
Tensile strength, p.s.i. ............................ 23
Load at 10% deflection, p.s.i. ..................... 1.5
Load at 50% deflection, p.s.i. ..................... 5.96
Load versus temperature at 25% deflection:
Temp., °C.—
  20 ............................load, p.s.i... 3.2
  0 ...............................do.... 3.2
  −10 .............................do.... 3.2
  −20 .............................do.... 3.3
  −30 .............................do.... 3.4
  −40 .............................do.... 4.1

*Example 5*

67 grams (.52 mol) gamma-methyl-epsilon-caprolactone, 133 grams (1.04 mols) of a mixture of beta- and delta-methyl-epsilon-caprolactones and 9.4 grams (0.15 mol) ethylene glycol were heated to a temperature of 60 to 70° C. in the presence of 0.47 gram boron trifluoride ethyl etherate (47% $BF_3$) as catalyst. 133 grams (3.02 mols) ethylene oxide and 0.69 gram dibutyltin oxide were added thereto in the course of 6.5 hours. The resulting mixture of linear oxyalkylene-carbooxyalkylene polymers was, after stripping to a kettle temperature of 150° C., a pale yellow viscous liquid having a carboxyl number of 2.58, a hydroxyl number of 55.3 and an iodine number of 0.84.

90 grams of the linear oxyalkylene-carbooxyalkylene polymers thus prepared and 10 grams of the branched oxyalkylene-carbooxyalkylene polymers prepared as described in Example 3 were mixed with 3.1 grams water and 2 grams N-methylmorpholine. 42 grams of a mixture of 65% 2,4- and 35% 2,6-tolylene diisocyanates containing 0.29% "Ethocel" were then added under intensive agitation. As soon as the foaming reaction began, the mixture was transferred into an open mold and allowed to expand.

The foam produced was removable from the mold after one hour, but was allowed to set for twenty-four hours at room temperature for complete curing. The test results were as follows:

Density, lbs./cu. ft. ............................... 2.06
Tensile strength, p.s.i. ............................ 18
Load at 10% deflection, p.s.i. ..................... 0.38
Load at 50% deflection, p.s.i. ..................... 0.70
Load versus temperature at 25% deflection:
Temp., °C.—
  20 ............................load, p.s.i... 1.3
  0 ...............................do.... 1.4
  −10 .............................do.... 1.5
  −20 .............................do.... 1.7
  −30 .............................do.... 2.1
  −40 .............................do.... 4.4

*Example 6*

The procedure of Example 5 was repeated, the proportions of oxyalkylene-carbooxyalkylene polmers employed however being 70 grams of the linear and 30 grams of the branched oxyalkylene-carbooxyalkylene polymers.

The resulting foam had the following physical properties:

Density, lbs./cu. ft. ............................... 1.94
Tensile strength, p.s.i. ............................ 19
Load at 10% deflection, p.s.i. ..................... 0.76
Load at 50% deflection, p.s.i. ..................... 1.05
Load versus temperature at 25% deflection:
Temp., °C.,—
  20 ............................load, p.s.i. .. 1.6
  0 ...............................do.... 1.6
  −10 .............................do.... 1.8
  −20 .............................do.... 2.2
  −30 .............................do.... 2.5
  −40 .............................do.... 3.6

*Example 7*

250 grams (2.2 mols) of unsubstituted epsilon-caprolactone were heated to a temperature of 90° C. with 36.5 grams (0.25 mol) adipic acid in the presence of 0.6 gram boron trifluoride ethyl etherate (47% $BF_3$) as catalyst. 260 grams (5.9 mols) of ethylene oxide were then added over a period of four hours while the reaction mix was maintained at 80 to 90° C.

The resulting mixture of oxyalkylene-carbooxyalkylene polymers was a yellow viscous product having a hydroxyl number of 26.2 and a carboxyl number of 15.3

100 grams of the linear oxyalkylene-carbooxyalkylene polymers thus obtained were mixed with 3.1 grams water and 1.0 gram N,N-dimethylbenzylamine. 40 grams of a mixture of 65% 2,4- and 35% 2,6-tolylene diisocyanates containing 0.5% "Ethocel" were then added under intensive agitation. As soon as the foaming reaction began, the mixture was transferred into an open mold and allowed to expand.

The foam was removed from the mold after one hour, but was allowed to set for twenty-four hours at room temperature for complete curing. The foam had a density of lbs./cu. ft.

*Example 8*

2560 grams (20 mols) of mixed methyl-epsilon-caprolactones were refluxed for seventeen hours with 6400 grams (200 mols) of methanol in the presence of 3.0 grams concentrated (96%) sulfuric acid. After cooling, the acid catalyst was removed by percolating over "Nalcite SAR" anion exchange resin. The excess methanol was then distilled off in a vacuum at a temperature below 60° C. 3000 grams of residue, consisting mostly of methyl-6-hydroxy methylcaproate, were obtained.

1396 grams (8.73 mols) of the above methyl-6-hydroxy methylcaproate were heated to 60° C. with 3.3 grams of boron trifluoride ethyl etherate (47% $BF_3$). 1396 grams (31.7 mols) of ethylene oxide were then added in the course of 4.0 hours at a temperature of 60 to 70° C. The reactants were then maintained at 60° C. for an additional hour. 2.34 grams of N-methylmorpholine were then added to destroy the boron trifluoride ethyl etherate.

1775 grams of the ethylene oxide adduct thus obtained were heated to 170° C. for twenty hours with 497 grams of ethylene glycol in the presence of 3.55 grams of tetraisopropyl titanate as catalyst while 174 ml. of methanol distilled off. The reactants were then placed under a vacuum of 14 mm. Hg and 476 grams of methanol and excess glycol distilled off.

The oxyalkylene-carbooxyalkylene polymer residue was a light brown viscous liquid having a hydroxyl number of 46.9, a carboxyl number of 0.64 and an average molecular weight of about 2340.

100 grams of the oxyalkylene-carbooxyalkylene polymers thus obtained were mixed with 3.1 grams water and 1.5 grams N,N-dimethylbenzylamine. 40 grams of a mixture of 65% 2,4- and 35% 2,6-tolylene diisocyanates containing 0.5% "Ethocel" were then added under intensive agitation. As soon as the foaming reaction began, the mixture was transferred into an open mold and allowed to expand.

The foam was removed from the mold after one hour, but was allowed to set for twenty-four hours at room temperature for complete curing. The foam had a density of 2.4 lbs./cu. ft.

*Example 9*

250 grams (2.91 mols) of gamma-butyrolactone were heated to a temperature of 65° C. with 13.4 grams (0.1 mol) of trimethylolpropane in the presence of 0.6 gram boron trifluoride ethyl etherate (47% $BF_3$) as catalyst. 250 grams (5.7 mols) of ethylene oxide were added over a period of 5.66 hours while the reaction mix was maintained at 65° C. 2.3 grams of dibutyltin oxide were then added to destroy the boron trifluoride complex. The reactants were then subjected to a vacuum of 4 mm. Hg at temperatures up to 50° C. whereby 110 grams of distillate, consisting mainly of gammabutyrolactone, were recovered.

The resulting mixture of oxyalkylene-carboaxyalkylene polymers was a pale yellow viscous liquid having a hydroxyl number of 54.0 and a carboxyl number of 3.5.

90 grams of the oxalkylene-carbooxyalkylene polymers thus prepared were mixed with 2.7 grams water and 0.25 gram N-methylmorpholine. 36 grams of a mixture of 65% 2,4- and 35% 2,6-tolylene diisocyanates containing 0.5% "Ethocel" were then added under intensive agitation. As soon as the foaming reaction began, the mixture was transferred into an open mold and allowed to expand.

The foam produced was removable from the mold after one hour, but was allowed to set for twenty-four hours at room temperature. The test results were as follows:

Density, lbs./cu. ft. ---------------------------- 2.14
Tensile strength, p.s.i. ---------------------------- 13
Load at 10% deflection, p.s.i. ---------------------- 0.91
Load at 50% deflection, p.s.i. ---------------------- 1.07

Load versus temperature at 25% deflection:
Temp., ° C.—
  20 _____load, p.s.i__ 1.40
   0 _____do____ 1.50
 −10 _____do____ 1.50
 −20 _____do____ 1.85
 −30 _____do____ 2.30
 −40 _____do____ 3.75

*Example 10*

250 grams (2.5 mols) of delta-valerolactone were heated to a temperature of 65° C. with 14.1 grams (.227 mol) of ethylene glycol in the presence of 0.6 gram boron trifluoride ethyl etherate (47% $BF_3$) as catalyst. 250 grams (5.7 mols) of ethylene oxide were added in the course of 5.5 hours while the reaction mix was maintained at 65° C. 2.3 grams of dibutyltin oxide were then added to destroy the boron trifluoride complex. The reaction mix was then subjected to a vacuum of 4 mm. Hg at temperatures up to 150° C. whereby 113 grams of distillate, consisting mainly of delta-valerolactone, were recovered.

The resulting mixture of oxyalkylene-carbooxyalkylene polymers was a pale brown viscous liquid having a hydroxyl number of 45.4 and a carboxyl number of 8.0.

100 grams of the oxyalkylene-carbooxyalkylene polymers thus prepared were mixed with 3.0 grams water and 0.5 gram N-methylmorpholine. 40 grams of a mixture of 65% 2,4- and 35% 2,6-tolylene diisocyanates containing 0.5% "Ethocel" were then added under nitensive agitation. As soon as the foaming reaction began, the mixture was transferred into an open mold and allowed to expand.

The foam produced was removable from the mold after one hour, but was allowed to set for twenty-four hours at room temperature. The test results were as follows:

Density, lbs./cu. ft. ---------------------------- 2.2
Tensile strength, p.s.i. ---------------------------- 9
Load at 10% deflection, p.s.i. ---------------------- 0.59
Load at 50% deflection, p.s.i. ---------------------- 0.79

Load versus temperature at 25% deflection:
Temp., ° C.—
  20 _____load, p.s.i__ 1.10
   0 _____do___ 1.10
 −10 _____do___ 1.20
 −20 _____do___ 1.25
 −30 _____do___ 1.55
 −40 _____do___ 2.0

*Example 11*

250 grams of epsilon-caprolactone, 89.3 grams of trimethylolpropane and 1.2 grams of boron trifluoride ethyl etherate (47% $BF_3$) were heated to 60° C. 250 grams of ethylene oxide were then added at 60° C. over a period of five hours. The resulting mixture of oxyalkylene-carbooxyalkylene polymers had a hydroxyl number of 190 and a carboxyl number of 1.4.

70 grams of the above oxyalkylene-carbooxyalkylene polymers, 2.2 grams of water and 1.5 grams of N,N-dimethylcyclohexylamine were mixed thoroughly. 45 grams of a mixture of 80% 2,4- and 20% 2,6-tolylene diisocyanate containing 2% "Ethocel" were then added to the above reactants under vigorous stirring. After ten seconds the mixture started foaming and was transferred to a metal mold, where the foam was allowed to rise. After one hour the foam was sufficiently cured to cut a test piece. It was a rigid foam having a density of about 2.5 lbs./cu. ft. which adhered tenaciously to the metal mold.

It is to be understood that numerous modifications will readily occur to those skilled in the art upon reading this description. All such modifications are intended to be included within the scope of the invention as defined in the appended claims.

We claim:

1. Method for preparing a foamed polymer which comprises reacting (1) oxyalkylene-carbonyloxy-alkylenes prepared by reacting (*a*) a polyfunctional focal compound of the group consisting of water, hydrogen sulfide and a compound having at least two reactive hydrogens in radicals of the class consisting of hydroxyl, amino and carboxy groups and combinations thereof with (*b*) a lactone containing from four to eight carbon atoms in the ring, and (*c*) an epoxide having an epoxy oxygen linked to vicinal carbon atoms with (2) a 100 to 700% molar excess of organic polyisocyanate and (3) water for extending the oxyalkylene-carbonyloxyalkylenes, extensively cross linking the extended oxyalkylene-carbonyloxyalkylenes and forming a foam.

2. Method as defined in claim 1 wherein the organic polyisocyanate and water are reacted substantially simultaneously with the oxyalkylene-carbonyloxyalkylenes.

3. Method as defined in claim 1 wherein the oxyalkylene-carbonyloxyalkylenes are first mixed with water and then mixed and reacted with the polyisocyanate.

4. Method as defined in claim 1 wherein the oxyalkylene-carbonyloxyalkylenes are first mixed and reacted with the polyisocyanate and then mixed and reacted with water.

5. Method as defined in claim 1 wherein a polyhydric alcohol, the lactone and the epoxide are reacted simultaneously in the presence of a Lewis acid catalyst to form oxyalkylene-carbonyloxyalkylenes for further reaction with organic polyisocyanate and water.

6. Method as defined in claim 1 wherein the oxyalkylene-carbonyloxyalkylenes are prepared by reacting a molar excess of a low molecular weight monohydric alcohol with the lactone, then reacting the product thereof with the epoxide, and finally reacting the intermediate thus formed with a polyfunctional focal compound as a chain stopper.

7. Method as defined in claim 1 wherein part of the water used to effect cross linking and foaming is replaced by a polycarboxylic acid.

8. Method as defined in claim 1 wherein about 0.001 to 10% by weight of ethoxylated cellulose is added to the reaction mixture as a stabilizing agent.

9. Method as defined in claim 1 wherein the polyfunctional focal compound is ethylene glycol.

10. Method as defined in claim 1 wherein the polyfunctional focal compound is trimethylol propane.

11. Method as defined in claim 1 wherein the lactone is an epsilon-caprolactone.

12. Method as defined in claim 1 wherein the lactone is an unsubstituted epsilon-caprolactone.

13. Method as defined in claim 1 wherein the lactone is a lower alkyl substituted epsilon-caprolactone.

14. Method as defined in claim 1 wherein the epoxide is ethylene oxide.

15. A foamed polymer prepared as defined in claim 1.
16. A foamed polymer prepared as defined in claim 6.
17. A foamed polymer prepared as defined in claim 7.
18. A foamed polymer prepared as defined in claim 8.
19. A foamed polymer prepared as defined in claim 9.
20. A foamed polymer prepared as defined in claim 10.
21. A foamed polymer prepared as defined in claim 11.
22. A foamed polymer prepared as defined in claim 12.
23. A foamed polymer prepared as defined in claim 13.
24. A foamed polymer prepared as defined in claim 14.

References Cited in the file of this patent

UNITED STATES PATENTS

| | | |
|---|---|---|
| 2,650,212 | Windemuth | Aug. 25, 1953 |
| 2,779,689 | Reis | Jan. 29, 1957 |
| 2,779,783 | Hayes | Jan. 29, 1957 |
| 2,780,350 | Simon et al. | Feb. 5, 1957 |